United States Patent [19]
Akeson

[11] 3,894,161
[45] July 8, 1975

[54] METHOD OF PROTECTING STORED SUGARBEETS AND AN ARTICLE USEFUL THEREFOR

[75] Inventor: Walter R. Akeson, Longmont, Colo.
[73] Assignee: The Great Western Sugar Co., Denver, Colo.
[22] Filed: Oct. 18, 1972
[21] Appl. No.: 298,525

[52] U.S. Cl.............................. 426/419; 426/443
[51] Int. Cl.............................................. A23l 1/00
[58] Field of Search.......................... 47/31; 52/3-5; 426/106, 121, 205, 410, 419, 524; 161/37; 21/2, 7, 60.5 R

[56] References Cited
UNITED STATES PATENTS

| | | | |
|---|---|---|---|
| 711,356 | 10/1902 | Simons | 52/3 |
| 3,355,845 | 12/1967 | Allersma | 52/5 |
| 3,439,865 | 4/1969 | Port | 426/106 |
| 3,450,544 | 6/1969 | Badran | 426/419 |
| 3,482,609 | 12/1969 | Neckerman | 47/31 |
| 3,769,747 | 11/1973 | Chapman | 47/31 |

OTHER PUBLICATIONS
The Chemistry and Technology of Food and Food Products, 2nd Ed., Jacobs, 1951, Interscience, N.Y., p. 1835.

Primary Examiner—Norman Yudkoff
Assistant Examiner—Hiram H. Bernstein
Attorney, Agent, or Firm—Eliot S. Gerber,

[57] ABSTRACT

Mats of woven flat strips of synthetic polymeric film having at least one rigid member attached to each end margin, useful in protecting piles of sugarbeets or similar articles stored on the ground and exposed to the atmosphere.

A method of protecting sugarbeets and similar articles stored in piles on the ground and exposed to the atmosphere by applying a plurality of the mats to the pile so that the longitudinal margins of adjacent mats overlap. Stakes are secured through the rigid members located at the end margins of the mats into the beet pile. The overlapping longitudinal margins are overlapped about at least one rigid member and stakes secured therethrough into the beet pile.

2 Claims, 7 Drawing Figures

PATENTED JUL 8 1975     3,894,161

METHOD OF PROTECTING STORED SUGARBEETS AND AN ARTICLE USEFUL THEREFOR

BACKGROUND OF THE INVENTION

Sugarbeets are conventionally harvested in a period of 2 to 4 weeks at the end of the growing season in the autumn. The beets are harvested by mechanical harvesters in the grower's fields and trucked to central receiving stations where they are dumped into the receiving hoppers of beet pilers. The pilers remove excess dirt, weeds and beet leaves from the beets as they pass over a cleaning screen. The beets are then conveyed along a swinging belt conveyor where they are distributed into storage piles. The storage piles are located on level ground out-of-doors, and normally range in size from about 17 feet to about 26 feet in height, from about 60 feet to 100 feet in width and from about 200 feet to 800 feet in length.

The sugarbeets are stored in these piles until they are ready for processing in the sugarbeet plant. Normally, the storage time is between about 90 to about 100 days, although sometimes as long as 150 days.

The stored sugarbeets are a living, respiring plant root that consumes stored sugar and oxygen from the atmosphere and produces carbon dioxide and heat in the process.

The optimum storage conditions for sugarbeets are at a temperature of about 38° to about 40° F., and between about 95% and about 98% relative humidity. Storage temperatures higher than optimum will increase the respiration rate and sugar loss rate. Storage temperatures between freezing and the optimum temperature causes rapid build-up of non-sucrose sugar impurities. Freezing causes rupture of cell tissues and rapid deterioration upon thawing.

Normally, sugarbeet storage piles are allowed to cool by natural circulation of ambient air, although it is also known to ventilate piles by mechanical means.

To prevent losses, application of straw to the piles, particularly the rims thereof, has been tried. However, the use of straw suffers from several disadvantages such as objectionable molding thereof, blowing away in winds, and contamination of the sugarbeets during subsequent processing.

Films of polymeric material have also been tried, but have been found to cause molding of the beets.

BRIEF DESCRIPTION OF THE PRESENT INVENTION

An object of the present invention is to provide an improved article useful in a method of storing sugarbeets and similar articles.

A further object of the present invention is to provide an improved method of protecting sugarbeet piles, and piles of similar materials, against deterioration during storage.

These and other objects are accomplished by at least partially covering a pile of sugarbeets or similar articles with a plurality of mats of woven flat strips or ribbons of synthetic polymeric material. The mats are applied to the pile so that longitudinal margins of adjacent mats overlap, each mat having at least one rigid member attached to both end margins thereof, securing the end margins of the mats to the pile by passing stakes through the rigid members, wrapping the overlapping longitudinal margins about at least one rigid member, and securing the longitudinal margins to the pile by passing stakes through the longitudinal rigid member.

Reference is made to the accompanying drawings which illustrate preferred embodiments of the present invention, and wherein.

DESCRIPTION OF PREFERRED EMBODIMENTS

Figure 1:
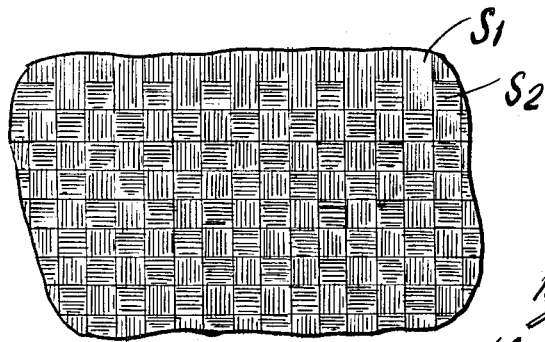
FIG. 1 is a plan view of the woven polymeric film material employed in the mats of this invention.

It has been found that mats of woven strips or ribbons of synthetic polymeric film material greatly reduces deterioration of sugarbeet piles. It is believed that this result is due to the ability of the mats to greatly reduce wind penetration into the pile sides while still allowing moisture movement through the minute pores of the woven material. This property appears to nearly eliminate the objectionable molding that occurs when solid plastic films are applied to the sides of beet piles. Also, the mats have been found to be capable of resisting tearing in high winds, is lightweight and flexible, and capable of lasting several seasons. Further, the introduction of contaminating material, such as occurs when straw is employed, is eliminated.

The mats are formed of woven, flat strips of synthetic polymeric materials. The preferred synthetic polymeric materials are the polyolefins such as polyethylene or polypropylene, the latter being preferred because of its high strength characteristics. Other synthetic polymeric material which can be extruded into films, oriented, and slit into strips may also be employed, such as polyamides and polyesters.

The mats, which are normally in widths of about 17 feet and lengths of about 28 to about 37 feet, are unrolled and secured to the sides of a sugarbeet pile. The longitudinal dimension of the mat generally parallels the up and down direction of the pile, i.e., is generally parallel to the fall line of the pile.

The mats are layed out on the sides of the sugarbeet pile so that adjacent longitudinal margins overlap. Both end margins of each mat have one or more rigid members attached thereto, which may be referred to as end rigid members. The end rigid members preferably have holes drilled therethrough so that stakes may be easily passed through.

After the ends of the mats are secured to the beet pile by staking, at least a portion of the overlapped longitudinal margins are pulled vertically upward into juxtaposition. At least one rigid member, which may be referred to as a longitudinal margin rigid member, is positioned against the vertically disposed overlapped margins, and the overlapped margins wrapped about the longitudinal margin rigid member until the mats are tight against the pile. Stakes are then passed through the longitudinal margin rigid member, preferably through holes previously drilled therethrough, and into the beet pile to secure the longitudinal margins.

The mats should not be applied to the sugarbeet pile any sooner than about 8 days after piling, and after the ambient temperature has dropped to about 50°F. or below.

During the time the temperature of the pile is between about 40° and 50°F., the bottom five feet or so of the beet pile should remain uncovered. Once the temperature drops to below about 40°F., the bottom portion of the pile sides should be covered. This is generally accomplished by having the mat length such that a portion may be left rolled-up around the bottom end rigid members, and unrolling the remainder at the appropriate time.

Referring now the drawings, FIG. 1 illustrates the woven fabric construction from which the mats of the present invention are fabricated. The strips $S_1$, $S_2$, etc. are woven together in the manner illustrated. Preferably, the strips are about 2 mm. wide and between about 1 and 10 mils thick.

Figure 2:
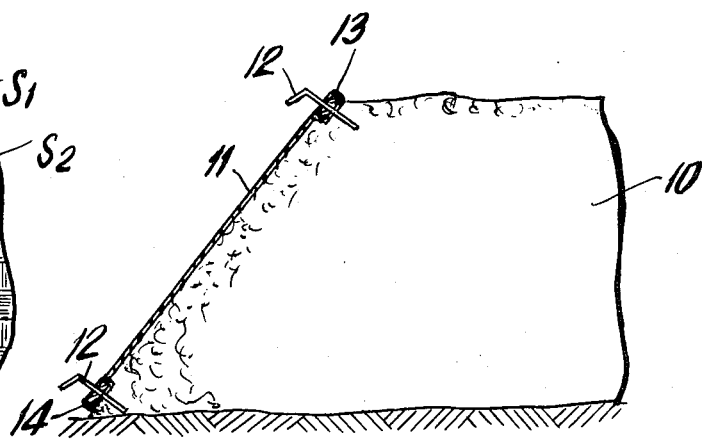
FIG. 2 is a cross-sectional plan view of the mats applied to a beet pile.

In FIG. 2, a pile of sugarbeets 10 is shown having mats 11 secured to the sides thereof. Stakes 12 pass through holes in upper end rigid members 13 and lower end rigid member 14 to secure the upper and lower portions of the mat to the beet pile 10. The top of the pile 10 may be covered with additional mats, or straw in the conventional manner, neither of which is illustrated.

Figure 3:
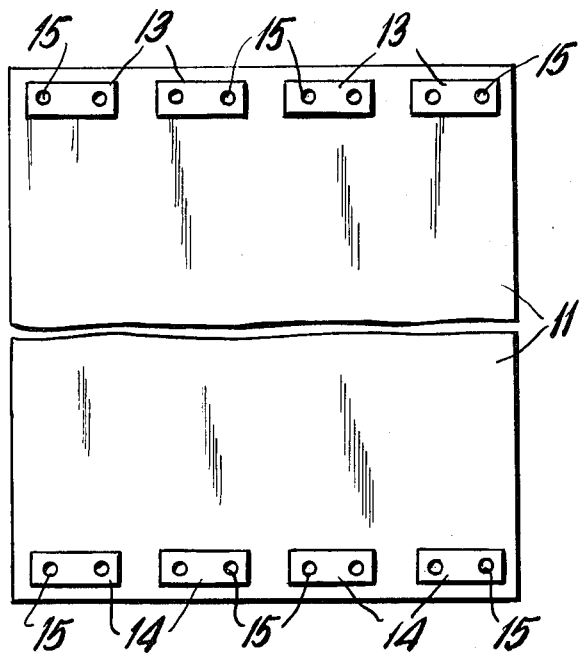
FIG. 3 is a schematic view of the mat of the present invention with rigid members attached thereto.

The mat 11 is separately illustrated in FIG. 3 with upper and lower end rigid members 13 and 14 shown attached thereto. The end rigid members have holes 15 drilled therethrough to permit easy passage of stakes therethrough at the time the mats are applied to a sugarbeet pile. As illustrated, four upper end rigid members 13 and four lower end rigid members 14 are employed in a specific embodiment where the mat is about 17 feet wide, each rigid member being about 4 feet long and conveniently formed from 2 inch by 4 inch lumber. The use of several rigid members across the width of the mat permits the mat to be easily folded for convenient storage and transport of the mats. For this purpose, the rigid members should be separated by a distance of about 3 to 6 inches. The rigid members 13 and 14 may be attached to the mat by any suitable means, such as stapling, nailing, etc.

One of the problems with employing sheet material as a protective covering is that wind separates the longitudinal margins from the pile, exposing the pile material to the elements. It has been found that this problem can be substantially eliminated by securing the longitudinal margins of the mats of this invention to the pile in the manner illustrated in FIGS. 4 to 7.

Figure 4:
FIG. 4 to 7 are cross-sectional schematic views of the method of securing the longitudinal margins of the mats of the beet pile.
Figure 5:
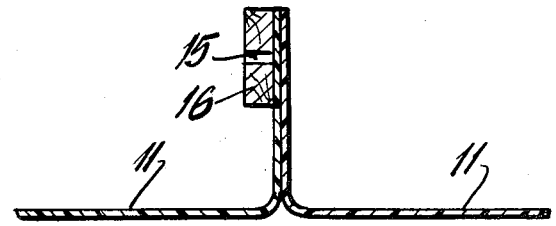
Figure 6:
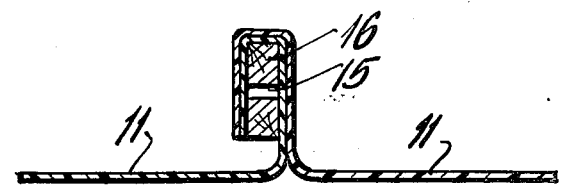
Figure 7:
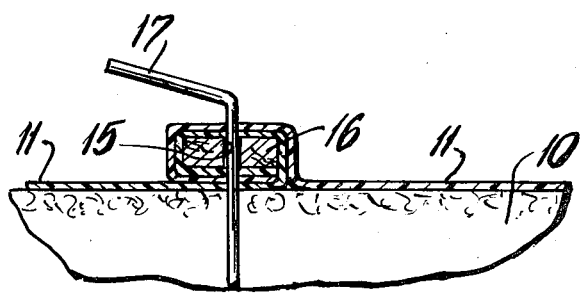

The mats 11 are applied to the pile 10 so that longitudinal margins of adjacent mats overlap, as shown in FIG. 4. After the upper and lower ends are secured to the pile in the manner previously described, the overlapping longitudinal margins of adjacent mats are vertically raised into juxtaposition as shown in FIG. 5. Longitudinal rigid member 16 is next place adjacent the juxtapositioned longitudinal margin portions of adjacent mats as shown in FIG. 5, and the longitudinal margin portions wrapped therabout until the respective mats are tight against the pile as shown in FIG. 6. The longitudinal margin portions of the mats may be secured to the longitudinal rigid member 16 by stapling, nailing, etc., but it is not necessary to employ any fastening means. Stakes 17 are then passed through longitudinal rigid members 16, preferably through holes previously drilled therethrough, and the longitudinal margins of the mats secured to the pile as illustrated in FIG. 7.

It is not necessary that longitudinal rigid members 16 be placed along the entire longitudinal margin length of the mats, and in practice they are separated by distances of up to about ten feet or more. It is of course apparent that at the top and bottom ends of the mats, the overlapped longitudinal margins cannot be wrapped about a longitudinal rigid member due to the presence of end rigid members 13 and 14. Therefore, the first longitudinal rigid member at the upper and lower ends of the mat must be located an appropriate distance away from the top and bottom end rigid members.

While the foregoing description has been made with reference to protecting sugarbeets against deterioration when stored in the outside atmosphere, it is clear that the use of the mats and the process of securing the mats to the piles has applicability to other materials similarly stored and subject to similar deterioration, such as piles of hay, corn, bagasse, woodchips, sawdust, and so forth.

I claim:

1. A method of protecting a pile of sugarbeets stored outside on the ground comprising covering at least the sides of the pile down to about 5 feet from the ground level with a plurality of mats at least 8 days after the pile was formed and after the ambient temperature has dropped to between about 40° and about 50° F., and covering the remainder of the pile down to ground level when the temperature has dropped to below about 40° F., said mats being formed of woven strips of polypropylene and having at least one rigid member attached to the upper and lower ends thereof, the mats being disposed on the pile so that the longitudinal dimensions thereof are generally parallel to the fall line of the pile sides and so that adjacent mats overlap along the longitudinal margins thereof, securing the upper and lower ends of the mat to the pile by passing stakes through the rigid members, wrapping the overlapping longitudinal margins of adjacent mats about at least one longitudinal rigid member to the pile by passing stakes therethrough.

2. A method of protecting sugarbeets stored as piles on the ground comprising covering at least the sides of the pile down to about five feet from the ground level with a plurality of mats at least eight days after the pile was formed and after the ambient temperature has dropped to between about 40° and about 50° F., and covering the uncovered portion when the temperature has dropped below about 40° F., said mats being formed of woven strips of an oriented synthetic polymeric film material selected from the group consisting of polyolefins, polyamides and polyesters and having at least one rigid member attached to the upper and lower ends thereof, the mats being disposed on the pile so that the longitudinal dimension thereof is generally parallel to the fall line of the pile sides and so that adjacent mats overlap along the longitudinal margins thereof, securing the upper and lower ends of the mat to the pile by passing stakes through the rigid member, wrapping the overlapping longitudinal margins of adjacent mats about at least one longitudinal rigid member, and securing the longitudinal rigid member to the pile by passing stakes therethrough.

* * * * *